May 13, 1958  J. MOIGNET  2,834,917
DEVICE FOR STARTING AND STABILIZING A WELDING ARC
Filed Jan. 31, 1956

INVENTOR
JACQUES MOIGNET
BY
ATTORNEY

United States Patent Office 2,834,917
Patented May 13, 1958

2,834,917

DEVICE FOR STARTING AND STABILIZING A WELDING ARC

Jacques Moignet, La Frette, France, assignor to L'Air Liquide, Societe Anonyme pour l'Etude et l'Exploitation des Procedes Georges Claude, Paris, France Application January 31, 1956, Serial No. 562,526

4 Claims. (Cl. 315—163)

There has been described in my co-pending application Serial No. 446,204, filed July 28, 1954, a device for the starting and stabilization of a welding arc, by discharge pulses from a condenser across the arc gap. This device is characterized on the one hand in that it comprises a pulse generating circuit, the voltage and recurrent frequency of which are relatively low, and on the other hand in that said circuit comprises a spark gap the electrodes of which are in a gas having a low dielectric strength.

According to my co-pending application Serial No. 446,204, the electrodes of the spark gap are preferably made of aluminium, and, in the case of gas-shielded welding, they are arranged in an enclosure through which the welding protection gas is caused to flow in such a manner that the active ends of these electrodes may be swept by the gas stream flowing towards the welding zone.

The present invention adds to the device of the prior patent application, an improvement, the object of which is to facilitate the initial starting of the arc and the restartings thereof during welding.

This improvement consists, in its broadest principle, in adding to a device generating pulses at a relatively low voltage, for instance of the order of 400 volts, sufficient for stabilizing an established welding arc, a circuit generating pulses of low energy, but at a substantially higher voltage, for instance of the order of 1000 to 1200 volts, suitable for ensuring the instantaneous initial starting of the arc with a cold electrode.

In its application to the prior patent application device, which superposes on the arc voltage recurrent discharges of a condenser through a spark gap, the improvement according to the present invention is characterized in that there is added to this device a second condenser, means for charging this second condenser to a voltage higher than the charging voltage of the first condenser, and means for periodically discharging the additional condenser across the arc gap for starting the arc. These latter means may comprise in particular, a spark gap in series between this additional condenser and one terminal of the arc. It will be advantageous to use, for this purpose, a spark gap according to the indications in the prior patent application.

The present addition is also concerned with an embodiment of the same improvement, in application to the device of the prior patent application, in its embodiment comprising a voltage step-up transformer, the secondary of which is shunted by a capacity having one terminal connected directly with one terminal of the arc and the other one connected to the other arc terminal through a condenser in series with a spark gap, according to the diagram represented in Figure 4 of the prior patent application. The new embodiment is characterized in that the chain consisting of the additional condenser and the spark gap arranged in series with said condenser, is connected in parallel with the chain comprising the above mentioned condenser and spark gap.

According to the same embodiment of this improvement, the following values will be adopted, advantageously, for the main elements of the device:

(a) The open circuit voltage of the step-up transformer secondary winding will be of the order of 800 volts;

(b) The capacity shunting this secondary winding will be about 0.1 µf.;

(c) The breakdown voltage of one of the spark gaps will be of the order of 400 volts and the capacity in series with this spark gap will be about 0.25 µf.;

(d) The breakdown voltage of the other spark gap will be of the order of 1000 volts and the capacity in series with this spark gap will be about 0.1 µf.

The invention will be described hereinafter with reference to the appended drawing wherein.

Figure 1:
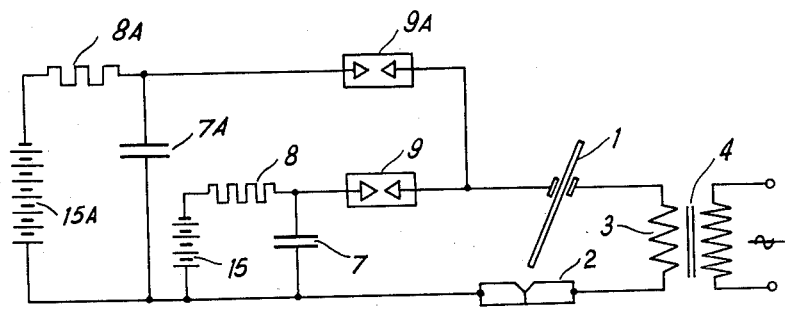
Figure 1 is a theoretical diagram of a welding circuit to which the improvement according to the present invention has been applied.

According to the theoretical diagram of Figure 1, a welding electrode 1 and a weldpiece 2 are connected with a welding current source, for instance with the secondary 3 of a transformer 4 connected to the mains.

The stabilizing circuit proper comprises a condenser 7, charged by an auxiliary current source 15 through a resistance 8. The terminals of this condenser 7 are connected: one directly with the weldpiece 2, and the other with the electrode 1 through a spark gap 9 in series. The elements described heretofore are arranged in an identical manner to that represented in Figure 2 of the prior patent application. According to the present invention, there is added, to these elements, a second condenser 7A, provided with an auxiliary source 15A, by which it is energized through a resistance 8A. One terminal of this condenser 7A is connected with the weldpiece 2 and the other with the electrode 1, through a spark gap 9A in series.

One of the spark gaps is adjusted for a relatively low breakdown voltage, for instance 400 v., and the other one for a higher voltage, for instance 1000 v. The auxiliary sources, as well as the condensers and resistances connected respectively to these two spark gaps have characteristics which are determined in accordance with these different breakdown voltages.

Figure 2:
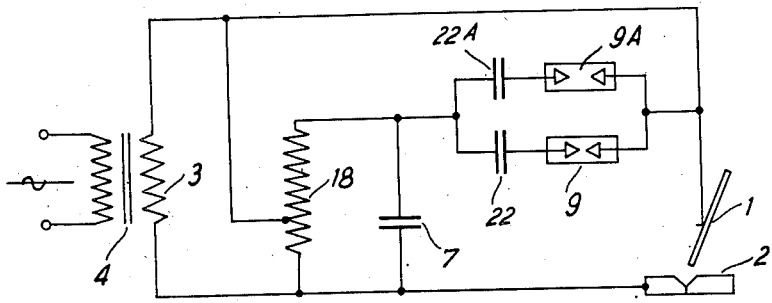
Figure 2 is a diagram representing the application of the improvement according to the present invention to a welding circuit of the type represented in Figure 4 of the prior patent application.

The diagram in Figure 1 being given mostly by way of a theoretical example, Figure 2 shows a preferred embodiment of the improvement according to the present invention.

Again, 1 is the welding electrode, 2 the part to be welded, 3 the source of welding current, consisting of the secondary of a transformer 4, the primary of which is connected to the mains. The open circuit voltage of this transformer may be, for instance, of the order of 60 v.

Between the electrode 1 and the weldpiece 2, there is connected, the primary of a voltage step-up transformer 18 which may, conveniently, be in the form of an auto-transformer and the ratio of transformation of which may be, for instance, of the order of 60/800.

The outer terminals of this auto-transformer are shunted by a condenser 7 the capacity of which may be, for instance, of the order of 0.1 µf.

One of the armatures of this condenser 7 is connected directly with the weldpiece 2 and the other one is connected with the welding electrode 1 through a condenser 22 and a spark gap 9 in series with said condenser.

The elements of Figure 2 described heretofore are the same as those in Figure 4 of the prior patent application. According to the present invention, there is added to these elements a chain consisting of a condenser 22A and a spark gap 9A in series with said condenser and this new chain is connected in parallel with the chain consisting of the condenser 22 and of the spark gap 9.

One of the spark gaps, spark gap 9 for instance, is adjusted for a breakdown voltage of the order of 400 volts for instance, and the condenser 22 associated in series with said spark gap has a capacity of the order of 0.25 μf. while the other spark gap 9a is adjusted for a breakdown voltage of the order of 1000 volts for instance, and its associated condenser 22a has a capacity of the order of 0.1 μf.

The low voltage chain, consisting of the condenser 22 and spark gap 9, acts for stabilizing the arc, while the high voltage chain, consisting of the condenser 22A and spark gap 9A acts only for starting with cold electrodes and re-starting during welding.

The operation of the device is analyzed hereinafter, successively for open-circuit conditions and under load.

In the case of open-circuit, the voltage across the terminals of the secondary 3 of the welding transformer is sinusoidal and the voltage across the output terminals of the auxiliary transformer 18 is also sinusoidal, with an effective value close to 740 volts.

Considering the operation during a half period, it is found that when the voltage increases at the output terminals of the transformer 18, nothing occurs up to a level of 400 volts. When this value is reached, the first spark gap 9 strikes and thus superposes an additional voltage of about 400 volts on the open circuit voltage. Simultaneously, the condenser 22 of 0.25 microfarad charges up, taking its energy, partly, from the condenser 7 of 0.1 microfarad connected with the secondary of the auto-transformer 18. This charging of the condenser 22 reduces to zero the potential difference at the terminals of the first spark gap 9. The open circuit voltage across the terminals 9 and the secondary 3 of the welding transformer keeps increasing and the same phenomenon is repeated when the potential difference across the terminals of the spark gap again reaches a value of 400 volts. The spark gap 9, therefore, delivers repeated surges of about 400 volts above the open circuit voltage. Considering the branch which comprises the spark 9A, it will be seen that its operation is strictly similar but that this spark gap 9A introduces, on top of the open circuit voltage, surges of about 1000 volts. The operations of these two branches are found to be relatively independent, to the extent in which they do not affect the voltage level in the condenser 7 shunting the secondary of the auto-transformer 18. Under open-circuit conditions, the surges of 1000 volts are sufficient to jump the arc gap and to start the arc at a distance.

In operation under load with a welding arc in an inert gas atmosphere with a refractory electrode, the operation is the same but the voltage rise at the secondary 3 of the welding transformer occurs only at the beginning of the half periods during which the workpiece 2 acts as a cathode. During this voltage rise, the spark 9 strikes, thereby charging condenser 22 and ensuring the starting of the arc and, consequently, the immediate establishment of the arc voltage. This, in turn causes the voltage level at the secondary of the auto-transformer 18 to be lower than the breakdown voltage for the spark gap 9, hence, a fortiori, lower than the breakdown voltage for the spark gap 9A. During operation under load, the circuit branch comprising the spark gap 9A is not involved, therefore, as long as the arc operates in a steady state. Its interventions occur only for the initial starting of the arc, for re-startings during welding and also for re-starting the arc in case of accidental misfires.

From a practical standpoint, the results obtained with the above set-up are as follows:

The initial starting with a cold electrode occurs immediately by contacting the electrode with the weldpiece.

The re-starting during welding, with a hot electrode obtains practically at a distance of 6 to 8 mm.

In low current welding, the operator is enabled to keep a long arc with no risk of putting the arc out, since the spark gap 9 A ensures an instantaneous re-start in case of an irregularity.

These results, therefore, are practically equivalent to those obtained with a high frequency set, energized with voltages of the order of 1700 volts effective, for instance. But the new set-up gives a much higher stability and arc regularity.

The choice of two different voltage levels for the stabilization and starting circuits is obviously applicable to the various circuits of my co-pending application S. N. 446,204. In the case of Figures 1 to 3 however, its practical application would be more complex since it would be practically necessary to provide two entirely independent circuits.

Experience has shown that very satisfactory results are obtained with voltages of the order of 1000 to 1200 volts, and very low energy discharges. It is therefore possible, in such conditions, to realize starting circuits according to the principle of condenser discharges across the arc gap, without affecting the life of the insulating materials in the welding set.

The improvement according to the present invention is also applicable when using, for starting and stabilizing the arc, thyratron controlled condenser discharges and it also offers in such a case the advantage that voltages of the higher levels for instance 1000 volts, are applied only for starting, since these relatively high voltages are unnecessary when it is only required to stabilize an established arc.

The improvement according to the present invention preserves, for the device of my co-pending application S. N. 446,204, its advantages as regards the good stabilization of the arc and the reduction to a very low level, of the radio-frequency radiation.

What I claim is:

1. A pulse generating circuit for starting and stabilizing an alternating current welding arc comprising, first capacitor means in series with a first gaseous discharge device, second capacitor means in series with a second gaseous discharge device having a firing voltage other than that of said first discharge device, means for charging said capacitor means, and circuit means for permanently connecting both said members in parallel with the welding arc terminals.

2. A pulse generating circuit for initiating and stabilizing an alternating current welding arc comprising a voltage step-up transformer, means for connecting the primary winding thereof across the welding arc terminals, a first capacitor in parallel with the secondary winding of said transformer, means for connecting one terminal of said secondary winding to one terminal of the welding arc, a second and a third capacitor each having one terminal connected to the other terminal of said secondary winding, and two gaseous discharge devices having different firing voltages respectively connected between the other terminals of said second and third capacitors and the other terminal of the welding arc.

3. In an inert-gas shielded alternating current arc welding circuit using a non-consumable electrode, a pulse generating circuit capable of automatically delivering across the arc gap high-voltage pulses required for starting a welding arc when said welding circuit is idling and recurrent pulses of a lower voltage required for stabilizing the welding arc after said arc has been started, comprising, a voltage step-up transformer, the primary winding of which is connected across the welding arc terminals, a first capacitor in parallel with the secondary winding of said transformer, a second and a third capacitor each having one terminal connected to one terminal of said secondary winding, the other terminal of said secondary winding being connected to the welding work-piece, and two spark gaps having different firing voltages respectively connected between the welding electrode and the other terminals of said second and third capacitors, the electrodes of said spark gaps being within an enclosure.

4. A pulse generating circuit for starting and stabilizing an alternating current welding arc in an inert-gas shielded arc welding circuit using a refractory electrode comprising, a voltage step-up transformer having a secondary voltage of the order of 800 volts, the primary of said transformer being connected across the welding arc terminals, a first capacitor of about 0.1 microfarad in parallel with the secondary winding of said transformer, a second capacitor of about 0.25 microfarad having one terminal connected to one terminal of said secondary winding, the other terminal of said winding being connected to the welding work-piece, a first spark gap having a breakdown voltage of about 400 volts in series between said second capacitor and the welding electrode, a third capacitor of about 0.1 microfarad also having one terminal connected to the aforesaid first terminal of said secondary winding and a second spark gap having a breakdown of about 1,000 volts in series between said third capacitor and said welding electrode.

No references cited.